US010525639B2

(12) United States Patent
Sokolov et al.

(10) Patent No.: US 10,525,639 B2
(45) Date of Patent: Jan. 7, 2020

(54) METHOD AND APPARATUS FOR FABRICATION OF LATTICE COMPOSITE FUSELAGE FOR COMMERCIAL AIRCRAFT EMPLOYING STEERED FIBER LAY UP

(71) Applicant: The Boeing Company, Chicago, IL (US)

(72) Inventors: Boris B. Sokolov, Renton, WA (US); Mostafa Rassaian, Bellevue, WA (US); Marc J. Piehl, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/024,477

(22) Filed: Jun. 29, 2018

(65) Prior Publication Data

US 2018/0305041 A1    Oct. 25, 2018

Related U.S. Application Data

(63) Continuation of application No. 15/467,980, filed on Mar. 23, 2017, now abandoned.

(51) Int. Cl.
*B29C 70/38* (2006.01)
*B29D 99/00* (2010.01)
(Continued)

(52) U.S. Cl.
CPC ............ *B29C 70/384* (2013.01); *B29C 70/38* (2013.01); *B29C 70/382* (2013.01);
(Continued)

(58) Field of Classification Search
CPC ..... B29C 70/384; B29C 70/382; B29C 70/38; B29C 70/388; B64F 5/10; B64C 1/068
See application file for complete search history.

(56) References Cited

U.S. PATENT DOCUMENTS

| 7,472,736 B2 | 1/2009 | Kisch et al. | |
|---|---|---|---|
| 2005/0247396 A1* | 11/2005 | Oldani | B29C 53/66 156/173 |

(Continued)

FOREIGN PATENT DOCUMENTS

| EP | 1977882 A1 | 10/2008 |
|---|---|---|
| EP | 3109152 A1 | 12/2016 |

*Primary Examiner* — Christopher T Schatz
(74) *Attorney, Agent, or Firm* — Felix L. Fischer

(57) ABSTRACT

A system for fabrication of an aerospace structure incorporates a mold having a surface and at least one unidirectional SFL head adapted to lay down a plurality of collimated tows in a predetermined laminated pattern on the mold surface to produce a fuselage skin. At least one cross plied laminate SFL head is adapted to lay down a cross plied laminate base interface on the fuselage skin to establish a lattice rib shape for each of a plurality of lattice ribs. The cross plied laminate SFL head has a band placement head steerable to avoid structural design features and to maintain spacing from adjacent steered lattice ribs. The unidirectional SFL head is further adapted to lay down a plurality of collimated tows on the base interface of each of the plurality of lattice ribs for a first plurality of unidirectional tow plies in each lattice rib. The unidirectional SFL head has a fiber placement head steerable to match the lattice rib shape to avoid structural design features and to maintain spacing from adjacent steered lattice ribs.

20 Claims, 10 Drawing Sheets

(51) Int. Cl.
*B64F 5/10* (2017.01)
*B64C 1/06* (2006.01)
*B64C 1/08* (2006.01)
B29L 31/30 (2006.01)
B64C 1/00 (2006.01)

(52) U.S. Cl.
CPC .......... *B29D 99/0014* (2013.01); *B64C 1/068* (2013.01); *B64C 1/08* (2013.01); *B64F 5/10* (2017.01); *B29L 2031/3082* (2013.01); *B64C 2001/0072* (2013.01)

(56) References Cited

U.S. PATENT DOCUMENTS

| | | |
|---|---|---|
| 2013/0337207 A1 | 12/2013 | Mueller et al. |
| 2016/0176123 A1 | 6/2016 | Pedigo et al. |
| 2016/0221271 A1 | 8/2016 | Yarker et al. |

\* cited by examiner

METHOD AND APPARATUS FOR FABRICATION OF LATTICE COMPOSITE FUSELAGE FOR COMMERCIAL AIRCRAFT EMPLOYING STEERED FIBER LAY UP

REFERENCE TO RELATED APPLICATIONS

This application is a continuation of application Ser. No. 15/467,980 filed on Mar. 23, 2017 entitled METHOD AND APPARATUS FOR FABRICATION OF LATTICE COMPOSITE FUSELAGE FOR COMMERCIAL AIRCRAFT EMPLOYING STEERED FIBER LAY UP having a common assignee with the present application, the disclosure of which is incorporated herein by reference.

BACKGROUND INFORMATION

Field

Embodiments of the disclosure relate generally to fabrication of composite structures for aircraft and more particularly to fabrication of aircraft fuselages having a modified lattice structure for carrying structural loads created with steered fiber layup using two or more heads for fiber placement with unidirectional tows and cross plied laminates providing high damage tolerance.

Background

Composite fuselages employed in existing commercial aircraft use composite skin supported by separately fabricated stiffening elements. Frames and stringers carry the substantial operational loads and are added to the composite skin after fabrication similar to metallic structural assembly approaches (a.k.a. "Black Aluminum" design). Skin, Frames and Stringers are typically fabricated based on different manufacturing technologies which require different manufacturing equipment, transportation of fuselage components from different production sites to the final assembly facility and final assembly of components (co-bonding, co-curing, fastening) to produce a section of fuselage. Furthermore, existing designs are based on the concept of orthotropic material which does not take full advantage of the available anisotropic properties of modern composite unidirectional materials. This results in excessive weight and cost, in growth of both Non-Recurring and Recurring Expenses (NRE, RE) in the course of manufacturing of composite fuselages. An alternative design concept has been used in space applications which is based on a uniform lattice structure (geodesic design) stiffening the skin. However, a uniform Lattice is less efficient in aircraft structures like fuselage sections which incorporate doors, windows, other openings and design features which disrupt the geometric lattice pattern.

Wet Filament Winding (WFW), which typically is used with a mandrel for fabrication, has been combined with lattice design to fabricate lattice-based cylindrical-shaped structures which are used in a number of space applications. Lattice design eliminates the need for stringers and frames to support structural requirements which make such structures more weight and cost efficient. WFW processes do not allow variation of the lattice geometry and rib shape in the course of the winding of the structure to incorporate doors, windows and other design-driven features. To address this problem design and fabrication of a uniform but non-optimal lattice structure is accomplished and then, after such uniform lattice is produced, required openings (cut outs) in the lattice are manually introduced and reinforced areas around openings are separately fabricated with additional plies of composite materials. Such an approach results in non-optimal structural efficiency, loss of potential weight savings and in increase of manufacturing cost. Further, WFW cannot be employed for a concave manufactured surface.

Traditional Automated Tape Lay-up (TATL) of slit tape with ATL machines is used to produce skin for sections of fuselage in current commercial aircraft production. TATL allows lay up in an automatic mode of fuselage skin incorporating required openings and reinforcements. However, frames and stringers must be fabricated based on different technologies which require different manufacturing equipment. As previously noted, transportation of the fuselage components from different locations to the final assembly facility and final assembly of components (co-bonding, co-curing, fastening) are then required.

It is therefore desirable to provide an apparatus and method for commercial aircraft fuselage construction which overcomes the disadvantages of the prior art.

SUMMARY

Exemplary embodiments provide a method for fabrication of an aerospace structure. At least one unidirectional Steered Fiber Lay-up (SFL) head is employed to lay down a plurality of collimated tows in a predetermined laminated pattern on a mold surface to produce a fuselage skin. At least one cross plied laminate SFL head is then employed to lay down a cross plied laminate base interface on the fuselage skin to establish a lattice rib shape for each of a plurality of lattice ribs. A band placement head in the cross plied laminate SFL head is steered to avoid structural design features and to maintain spacing from adjacent steered lattice ribs. The unidirectional SFL head is then employed to lay down a plurality of collimated tows on the base interface of each of the plurality of lattice ribs for a first plurality of unidirectional tow plies in each lattice rib. A fiber placement head in the unidirectional SFL head is steered to match the lattice rib shape to avoid structural design features and to maintain spacing from adjacent steered lattice ribs. The cross plied laminate SFL head is then employed to lay a cap over the plurality of unidirectional tow plies in each of the plurality of lattice ribs and a band placement head in the cross plied laminate SFL head is steered to track the lattice rib shape and position the cap over the plurality of unidirectional tow plies.

A system for fabrication of an aerospace structure usable in the described method incorporates a mold having a surface and at least one unidirectional SFL head adapted to lay down a plurality of collimated tows in a predetermined laminated pattern on the mold surface to produce a fuselage skin. At least one cross plied laminate SFL head is adapted to lay down a cross plied laminate base interface on the fuselage skin to establish a lattice rib shape for each of a plurality of lattice ribs. The cross plied laminate SFL head has a band placement head steerable to avoid structural design features and to maintain spacing from adjacent steered lattice ribs. The unidirectional SFL head is further adapted to lay down a plurality of collimated tows on the base interface of each of the plurality of lattice ribs for a first plurality of unidirectional tow plies in each lattice rib. The unidirectional SFL head has a fiber placement head steerable to match the lattice rib shape to avoid structural design features and to maintain spacing from adjacent steered lattice ribs.

The method and system for fabrication provide a damage tolerant lattice rib structure having a skin formed from a plurality of collimated tows in a predetermined laminated pattern. A cross plied laminate base interface is laid on the fuselage skin to establish a lattice rib shape for each of a plurality of lattice ribs with the lattice ribs steered for lateral displacement from features in the skin. A first plurality of collimated tows is laid on the base interface of each of the plurality of lattice ribs for a first plurality of unidirectional tow plies in each lattice rib. A first cap is laid over the plurality of unidirectional tow plies in each of the plurality of lattice ribs. A second plurality of collimated tows is laid on the first cap of each of the plurality of lattice ribs for a second plurality of unidirectional tow plies in each lattice rib. A second cap is then laid over the second plurality of unidirectional tow plies in each of the plurality of lattice ribs.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments and methods described herein provide combined use of automated Steered Fiber Lay-up (SFL) and lattice design to fabricate integrally stiffened, stringerless sections of composite fuselage which incorporate windows, doors and other design features. The fuselage skin and stiffening lattice are fabricated as integral structure on the surface of a mold employing an automatic layup machine. This approach eliminates the need to separately produce skin, stringers and frames by different manufacturing equipment and a final assembly using co-curing, co-bonding, fastening. Use of automated SFL allows variation in lattice geometry and rib shape to accommodate local design features or disruptions. Unlike WFW no manual layup is required to support local reinforcement in areas of features or disruptions such as fuselage openings.

Figure 1A:
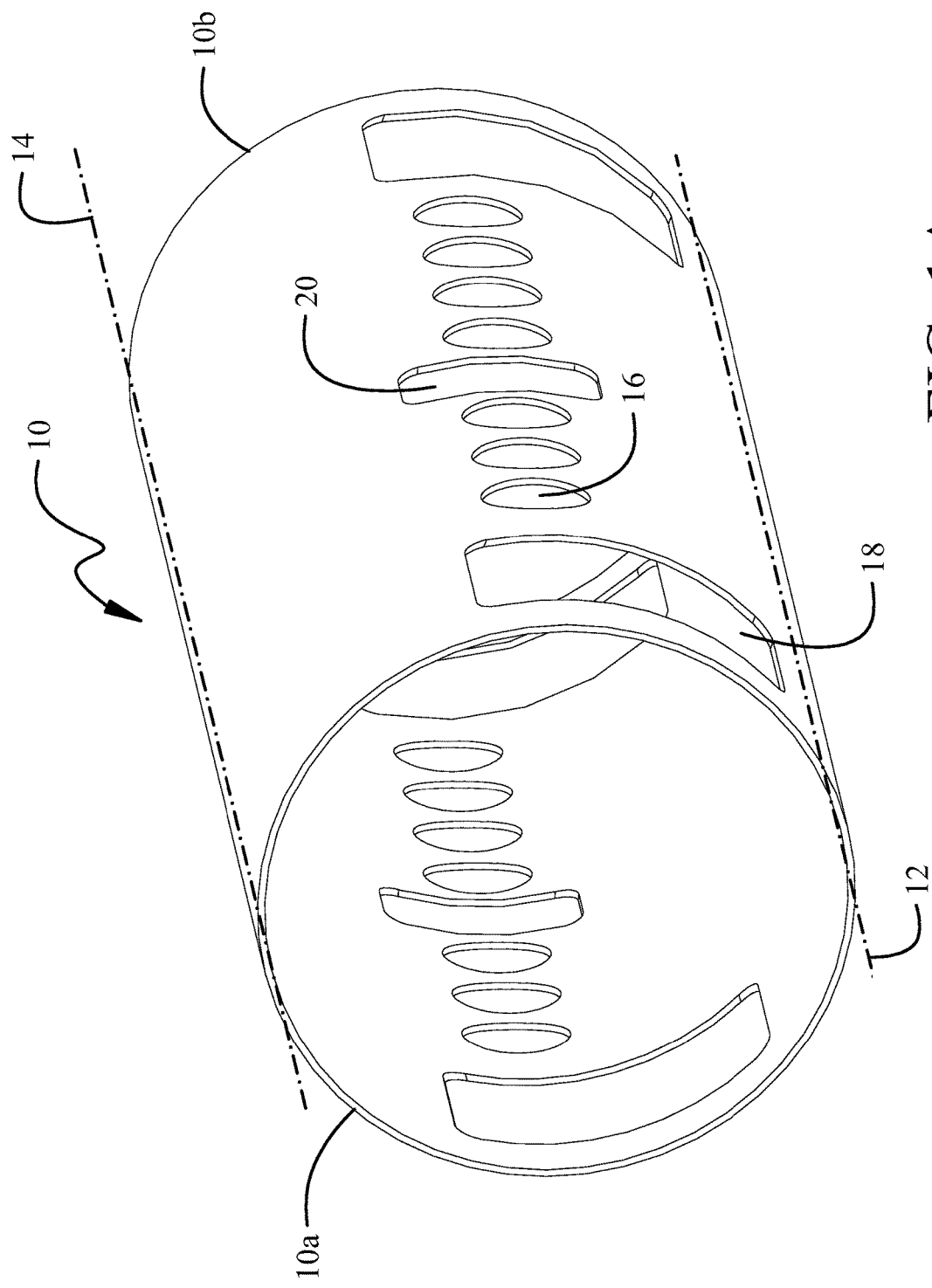
FIG. 1A is a depiction of an exemplary fuselage producible with the methods and apparatus embodiments disclosed herein.
Figure 1B:
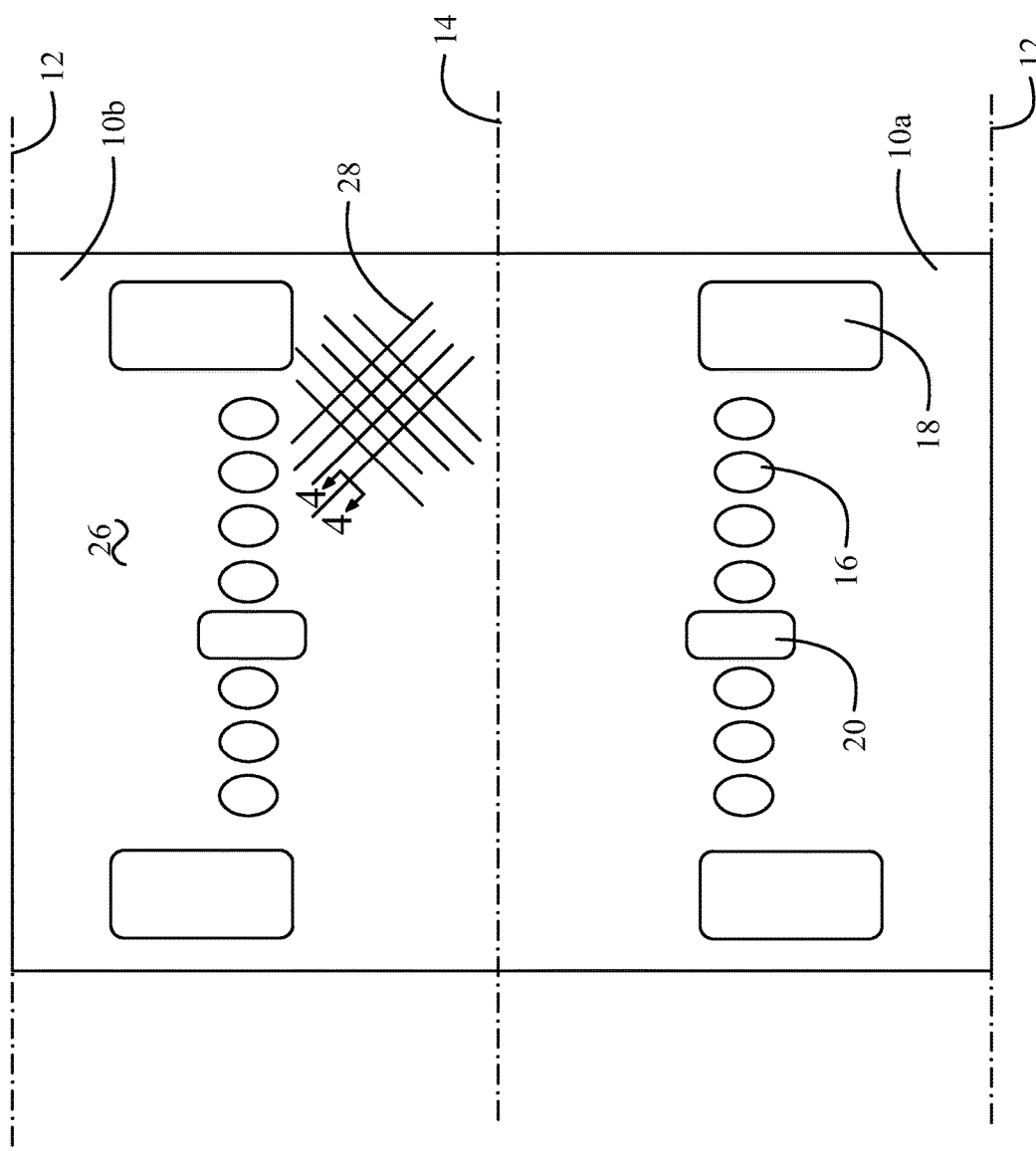
FIG. 1B is a flat layout depiction of the fuselage of FIG. 1A split along the keel line and flattened about the crown line.

Referring to the drawings, FIG. 1A shows an exemplary fuselage section 10 for a commercial aircraft and FIG. 1B shows the fuselage depicted in a flat layout separated at the keel line 12 and showing the crown centerline 14 providing two fuselage half sections 10a, 10b. Window openings 16, door openings 18 and emergency exit openings 20 are shown as exemplary design features to be accommodated in the manufacturing process.

Figure 2:
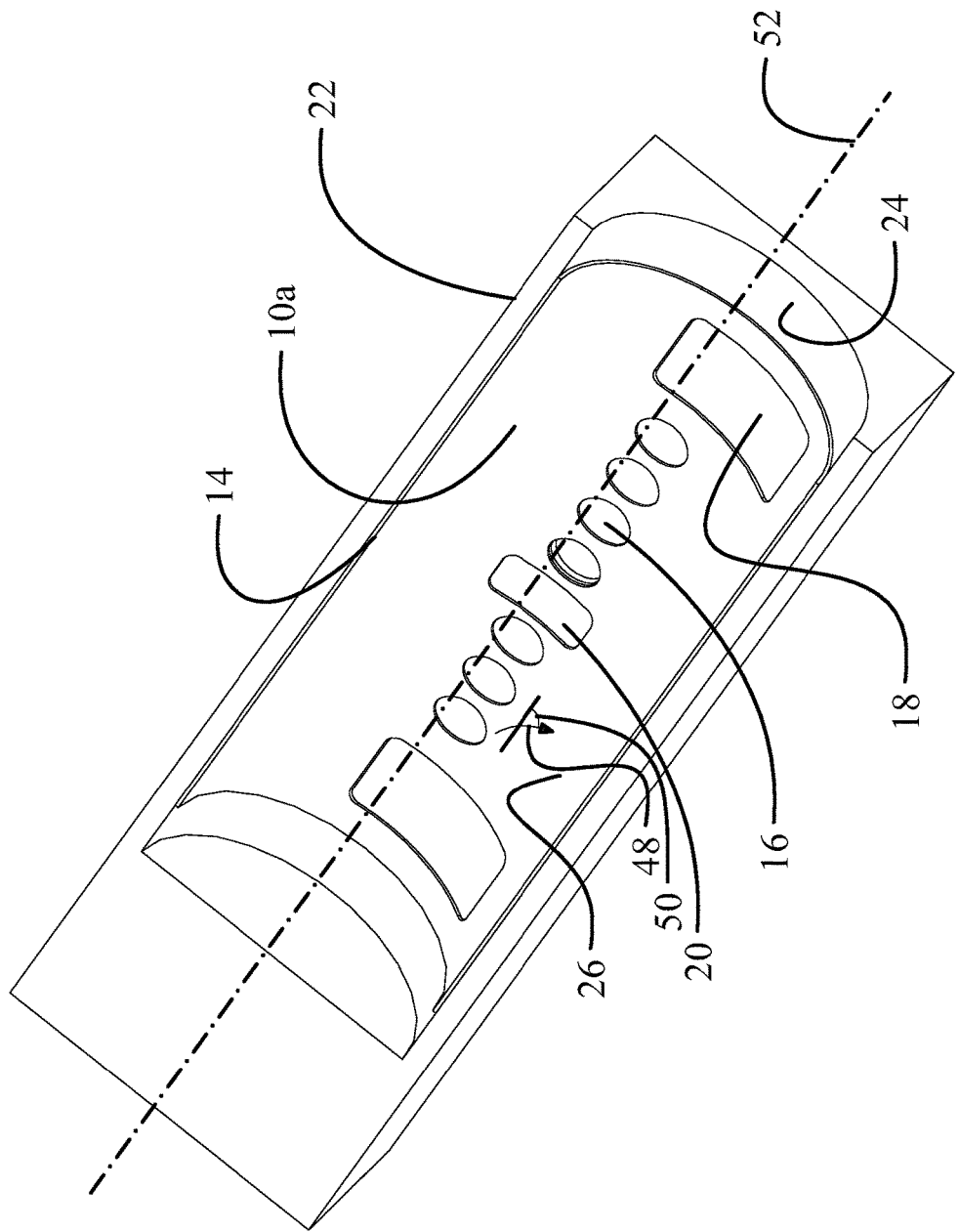
FIG. 2 is a pictorial representation of an exemplary mold for layup of the fuselage half sections.
Figure 3A:
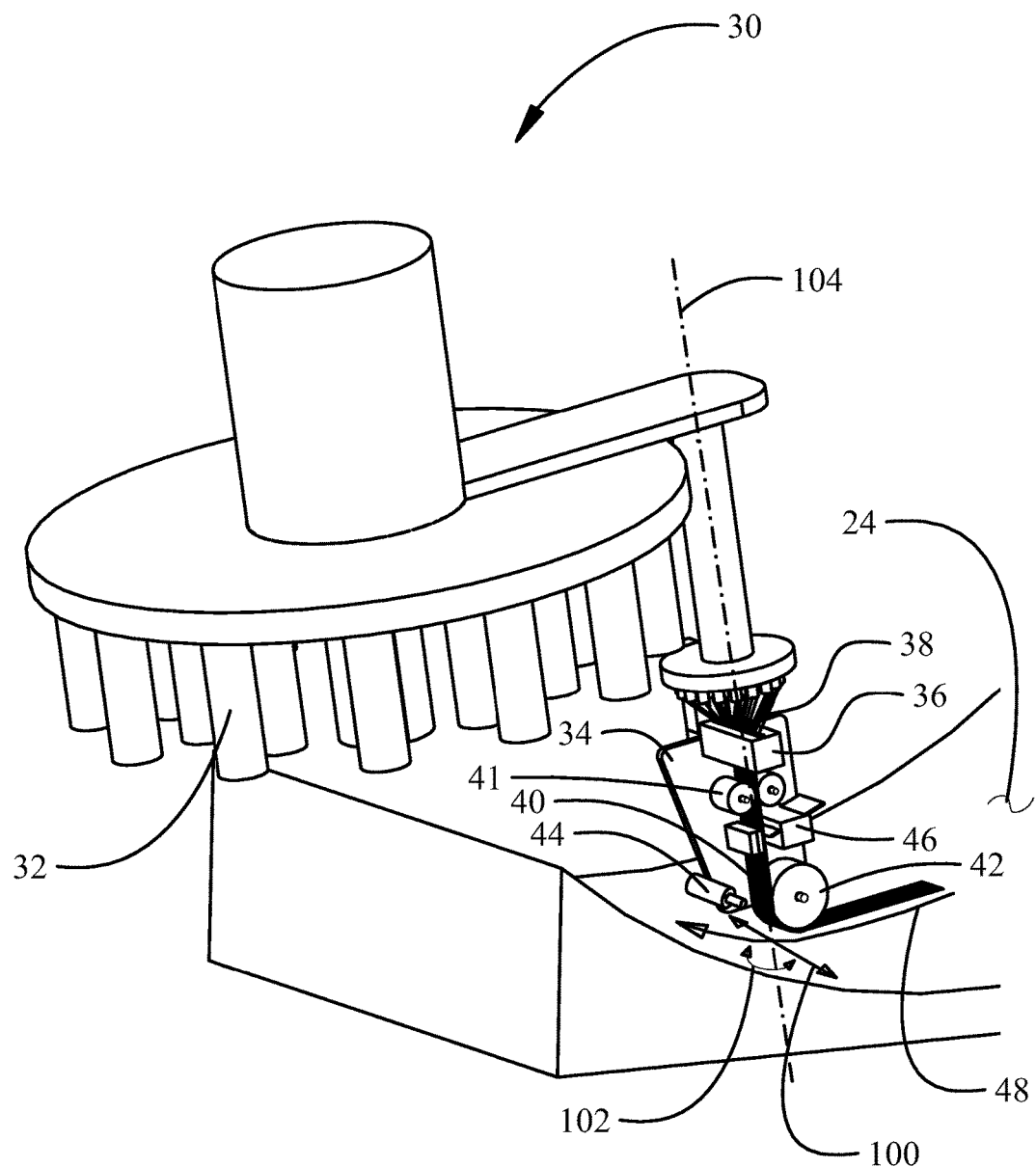
FIG. 3A is a representation of a unidirectional steered fiber layup (SFL) head for collimated fiber tows.

As seen in FIG. 2, a mold 22 having a concave molding surface 24 is provided for layup of the fuselage half section 10a, as exemplary. While half-sections, fabricated and then joined at the keel and crown are shown as an example embodiment, alternative geometric sections may be employed for fabrication and subsequently joined. As seen in FIG. 1B, each fuselage half section incorporates a skin 26 and a lattice rib structure 28 (shown partially overlaying a portion of the skin in the drawing). One or more SFL heads, notionally represented in FIG. 3A are employed to lay down collimated tows of unidirectional tows of resin impregnated carbon fiber, or other structural laminate systems, in multiple passes to form the skin 26. As seen in FIG. 3A, a first exemplary unidirectional SFL head 30 incorporates a plurality of spindles 32 each carrying tows of fiber. Tows are dispensed from the spindles 32 with controlled tension to a fiber placement head 34. Details of individual tow routing the spindles and all associated idlers and rollers for directional control are known in the art and are not shown in the drawings for simplicity. A band collimator 36 combines the individual tows 38 into collimated tows 40 which are fed through tow restart rollers 41 and pressed initially onto the concave surface 24 of the mold 22 (and subsequently on prior laid fiber bands for multiple layer laminates) by a compaction roller 42. A controlled heat source 44 is provided proximate the compaction roller for adhering the collimated tows. A tow cutter and clamp mechanism 46 is provided to terminate each unidirectional tow run along the direction of head travel (denoted by arrow 48). Termination and restart of tow runs at design features, such as the window openings 16 and door openings 18, may be accomplished with the tow cutter and clamp mechanism 46 as known for prior SFL placement processes. Exemplary SFL heads may employ collimated tows of 32 individual tows with exemplary width of 3.2 mm, 6.4 mm and 12.7 mm resulting in collimated tows widths of 102 mm, 205 mm and 406 mm respectively. The number of tows may be adjusted for structural requirements of the skin. As previously described a plurality of SFL heads 30 may be employed for laying down desired collimated tows widths during the skin layup. Each SFL head 30 is controllable to provide a desired angle 50 relative to a baseline axis 52 (as shown in FIG. 2) for the direction of head travel in each run or pass, the angle 50 variable in each run to achieve desired collimated tows orientation in the laminated skin 26.

Figure 4:
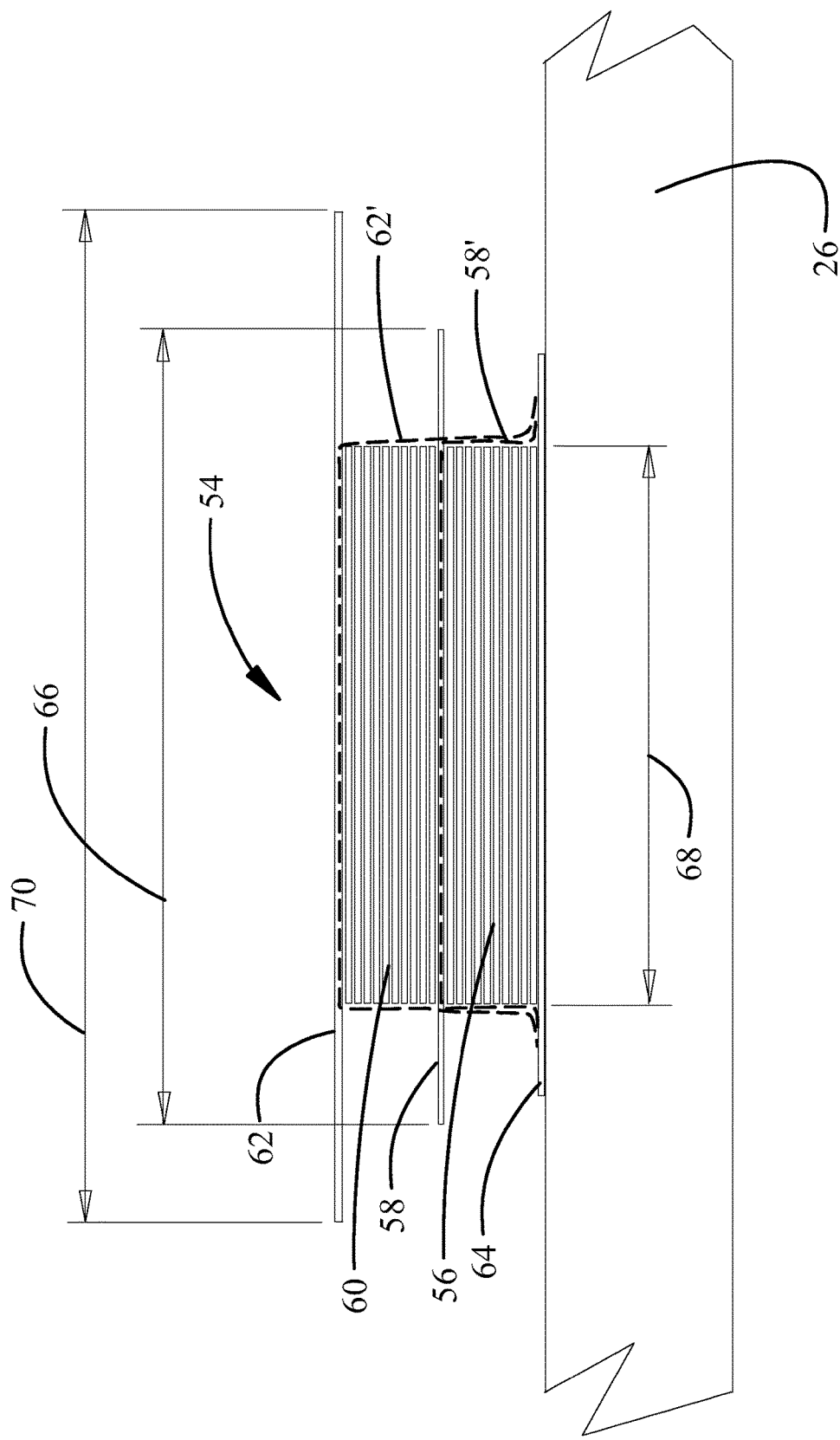
FIG. 4 is a cross-sectional representation of the fuselage skin and an exemplary lattice rib layup.

Upon completion of the SFL skin layup, a lattice rib structure 28, as previously described with respect to FIG. 2, is introduced. As seen in FIG. 4, each lattice rib 54 is overlaid to extend from the skin 26 with a multilayer structure having at least a first plurality of unidirectional tow plies 56 with a cap 58 of an integrated cross plied laminate. A second plurality of unidirectional plies 60 is added with a second cap 62 of integrated cross plied laminate. In the exemplary embodiment, a base interface 64 of integrated cross plied laminate is laid down as the initial layer of the lattice rib. As shown in FIG. 4, the first integrated cross plied laminate cap 58 has a width 66 greater than a width 68 of the first plurality of unidirectional tow plies 56 to allow the cap 58 to drape over the unidirectional tow plies 56 and onto the skin 26 as shown in cap phantom 58'. Similarly, the second integrated cross plied laminate cap 62 has a width 70 allowing the cap 62 to drape over the second plurality of unidirectional tow plies 60, the first cap 58 and the first plurality of unidirectional tow plies 56 onto the skin 26 as shown in cap phantom 62'. In alternative embodiments, the length of drape and overlap in the caps may be altered to achieve desired structural design requirements. While two integrated cross plied laminate caps are shown in the example of the drawings, multiple integrated cross plied laminated caps interleaved with various pluralities of unidirectional tow plies may be employed as required for structural design requirements. The combination of lattice ribs incorporated in a modified geodesic lattice with the configuration as defined in FIG. 4 as described provides enhanced damage tolerance.

Figure 3B:
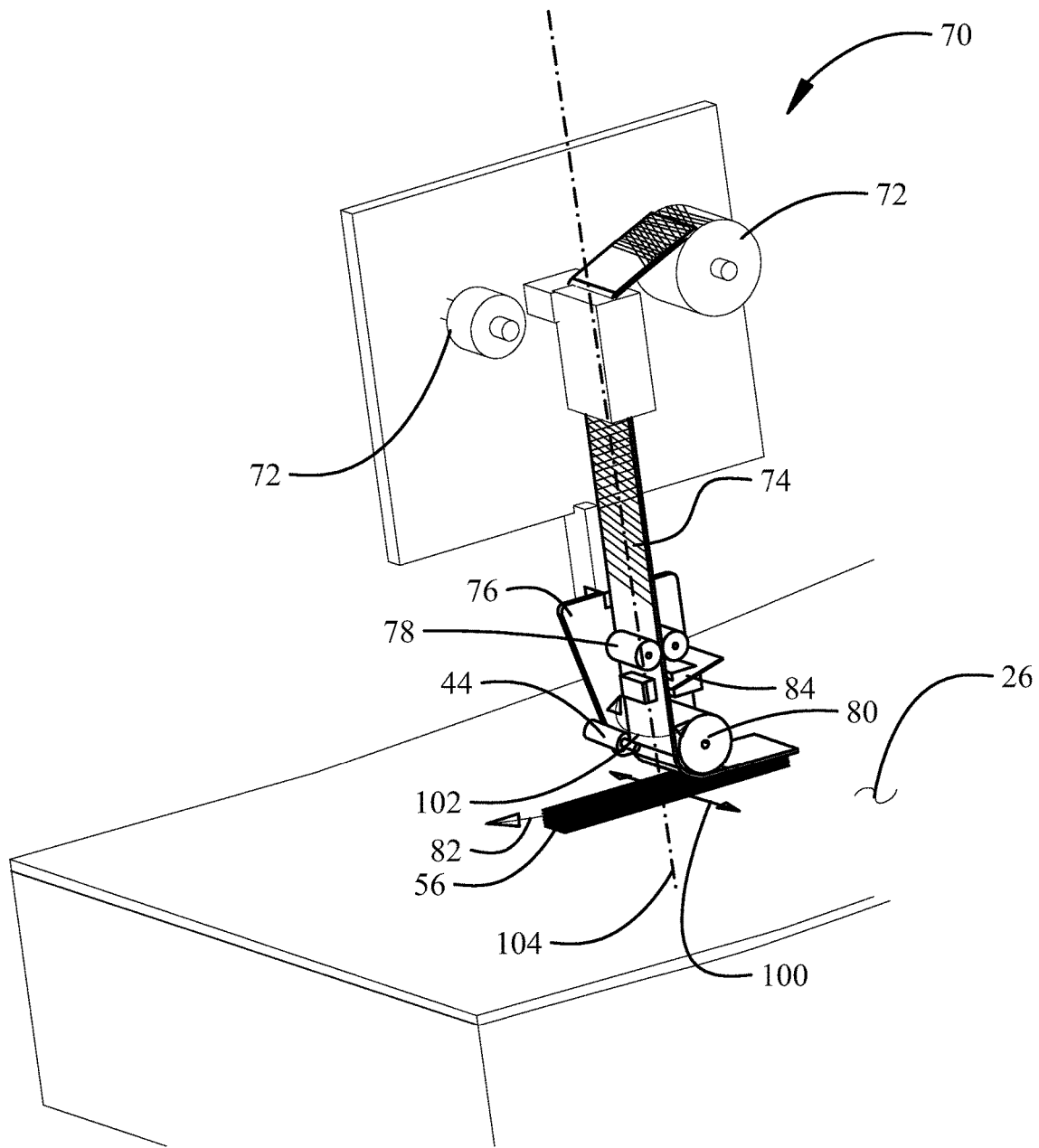
FIG. 3B is a representation of a cross plied laminate SFL head for cross plied fiber laminate bands.

The unidirectional tow plies 56, 60 in each lattice rib 54 are laid down employing a unidirectional SFL head 30 as described with respect to FIG. 3A providing a collimated tows width equal to the desired width 68 of the pluralities of unidirectional tow plies. As shown in FIG. 3B, one or more cross plied laminate SFL heads 70 incorporate cassettes 72 having rolled cross plied fiber laminate bands of determined widths 66, 70 for the caps 58, 62 and any desired base layer 64. Cross plied laminate band 74 is fed under controlled tension to a band placement head 76. The band 74 is fed through band restart rollers 78 and pressed initially onto the skin 26 as a base interface 64 or prior laid unidirectional tow plies 56, 60 by a compaction roller 80. A controlled heat source 82 is provided proximate the compaction roller for adhering the band. A band cutter and clamp mechanism 84 is provided to terminate each band run along the direction of head travel (denoted by arrow 86).

Cross plied fiber laminate bands are created with warp and weft laydown as is known in the art. The cross plied laminate may be created in sheets and cut or slit into the desired band widths. The laminate bands are then prewound onto cassettes 72.

Figure 5:
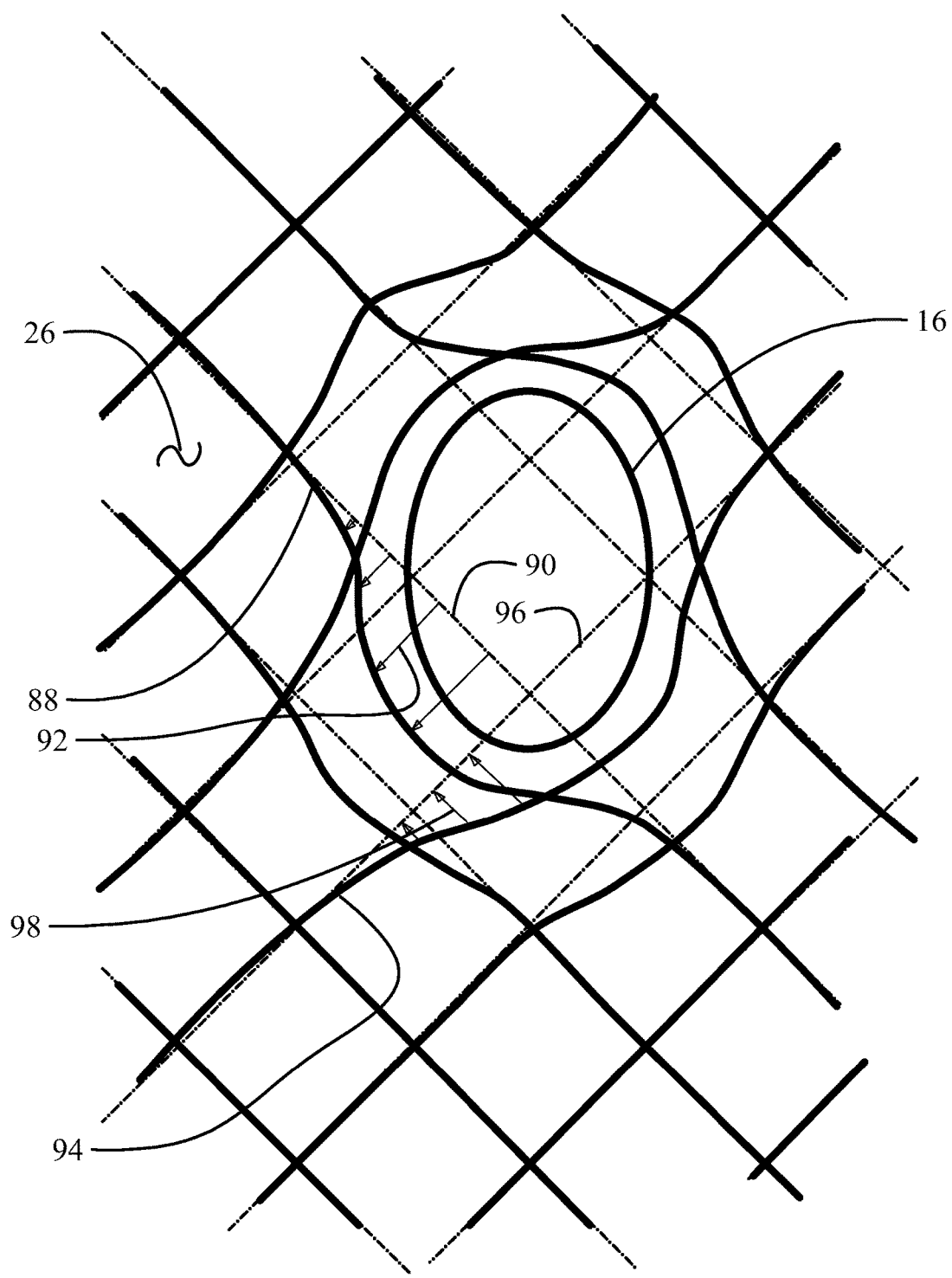
FIG. 5 is a representation of a modified geodesic lattice rib pattern produced by the methods and apparatus embodiments disclosed herein.

For the lattice rib structure, both the unidirectional SFL heads 30 and cross plied laminate SFL heads 70 are steerable for lateral divergence from a baseline geodesic lattice layout. As seen in FIG. 5, a first example lattice rib 88 is laid down in a first geodesic direction. Without steering, the lattice rib 88 would intersect a window 16 as represented by geodesic line 90. SFL heads 30 and 70 are steered during placement of unidirectional fiber tows and cross plied laminate band to laterally displace the lattice rib 88, as represented by arrows 92, in a smooth contour around the window 16 and then rejoin the geodesic line 90. This allows the lattice rib 88 to be continuous with resulting continuity of stress reaction along the length of the rib and around the disrupting feature such as window 16.

Similarly, a second example lattice rib 94 is laid down in a second geodesic direction (complimentary to the first geodesic direction). Without steering, the lattice rib 94 would also intersect the window 16 as represented by geodesic line 96. SFL heads 30 and 70 are steered during placement of unidirectional collimated tows and cross plied laminate band to laterally displace the lattice rib 94, as represented by arrows 98, in a smooth contour around the window 16 and then rejoin the geodesic line 96. This allows the lattice rib 94 to be continuous with resulting continuity of stress reaction along the length of the rib and around the disrupting feature such as window 16.

Lattice ribs of the geodesic pattern proximate lattice rib 88 and lattice rib 94 are steered during placement to maintain spacing from adjacent ribs. Spacing of lattice ribs is compressed in the proximity of the design features such as window 16 which are steered around resulting in a modified geodesic pattern for the ribs as seen in FIG. 5.

To accommodate steering for placement of the unidirectional collimated fiber bands and cross plied laminate bands in the lattice ribs, the fiber placement heads 34 and band placement heads 76 of SFL heads 30 and 70 are laterally translatable relative to the direction of head travel (48 and 86) as represented by arrows 100 in FIGS. 3A and 3B. Additionally to maintain fiber or band alignment with the direction of travel, the fiber placement heads 34 and band placement heads 76 may be rotatable as represented by arrows 102 about an axis 104 nominally perpendicular to the laydown surface.

While described herein for a concave mold, the processes and apparatus disclosed may be employed for molds having a convex surface or mixed concave/convex surface.

Figure 6:
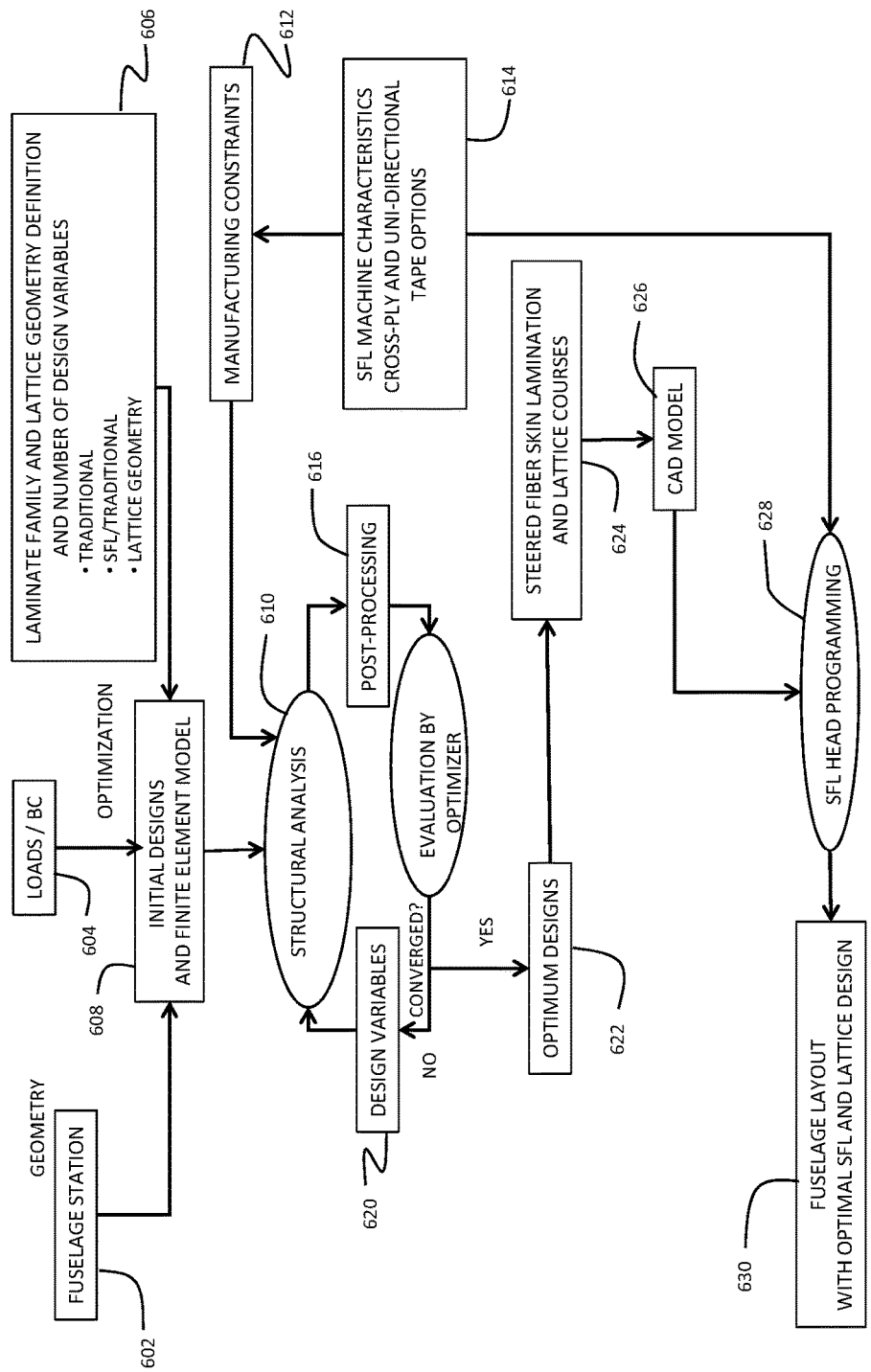
FIG. 6 is a flow chart demonstrating a design process for determining programming of the SFL heads for skin and geodesic lattice rib placement; and, FIGS. 7A and 7B are a flow chart demonstrating fabrication of a fuselage half section employing the embodiments described herein.

Establishing the requirements for layout and machine programming to accommodate the desired combination of laminated skin and modified geodesic lattice ribs is accomplished as shown in FIG. 6. Defined geometry of the fuselage station, 602, calculated aerodynamic and structural loads and boundary conditions, 604 and information regarding the laminate family to be employed, such as carbon fiber reinforced plastic (CFRP) with a baseline lattice geometry definition for rib placement, 606, are employed to synthesize an initial design and produce a finite element model, 608. Structural analysis of the design is then accomplished, 610, with input on manufacturing constraints, 612, including SFL machine characteristics and cross-ply band and uni-directional tow band information, 614. The structural analysis is iterated with post-processing, 616, and evaluation with an optimizer, 618. If the optimizer does not produce a converged solution, the design variables such as tow width and tow steering angle, collimated tows widths, cross plied laminate band characteristics, lattice rib configuration and skin lamination geometry are modified, 620 and the analysis repeated. Upon obtaining a converged result, the optimum design, 622, is produced and the steered fiber skin lamination and lattice courses extracted, 624. A three dimensional computer aided design (3D CAD) model is then created, 626. Programming of the SFL heads is then accomplished, 628, with the CAD model and SFL machine characteristics as inputs. The programmed SFL heads then produce the desired fuselage layout with optimal skin lamination and lattice rib structure, 630.

Figure 7A:
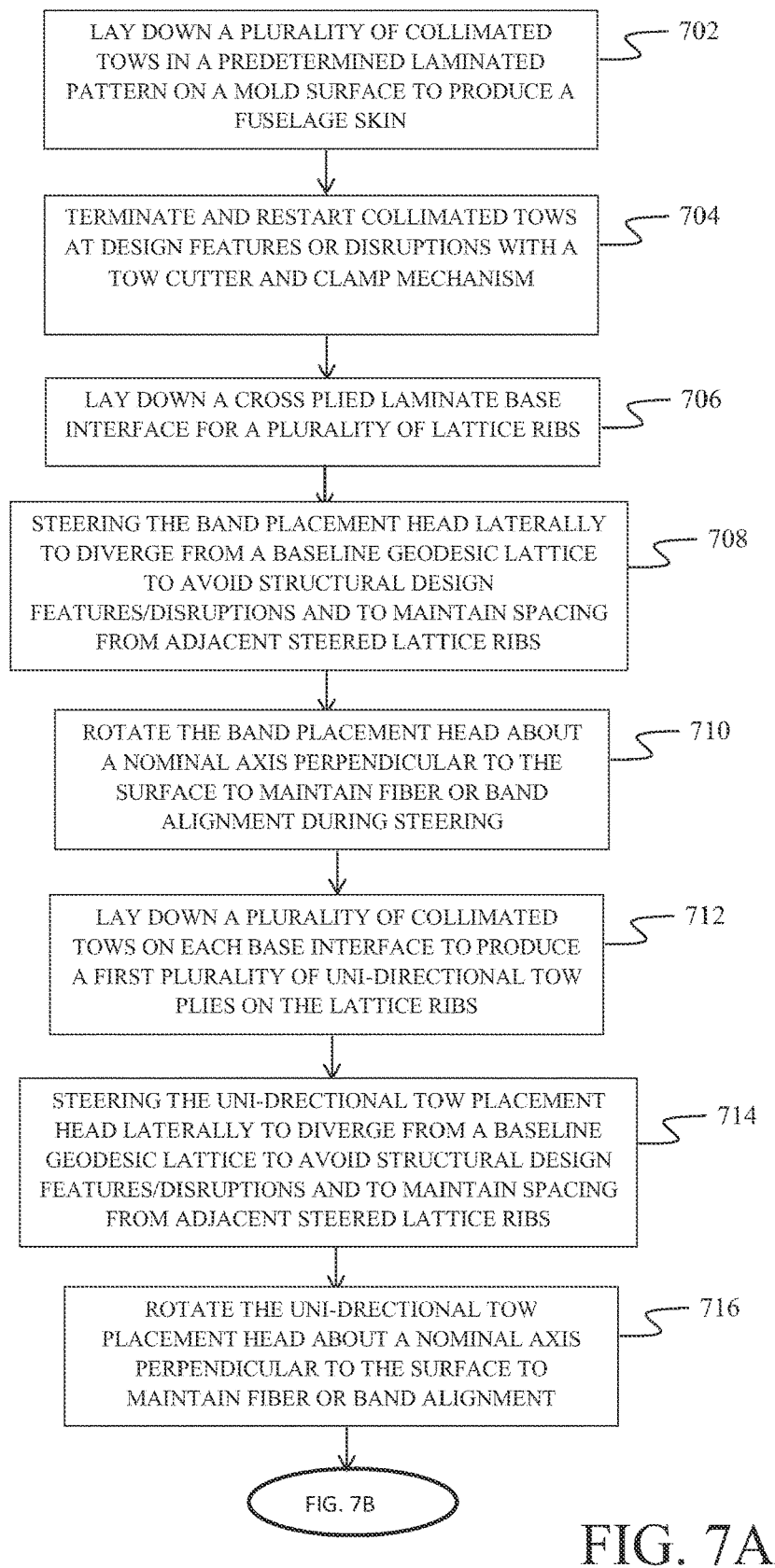
Figure 7B:
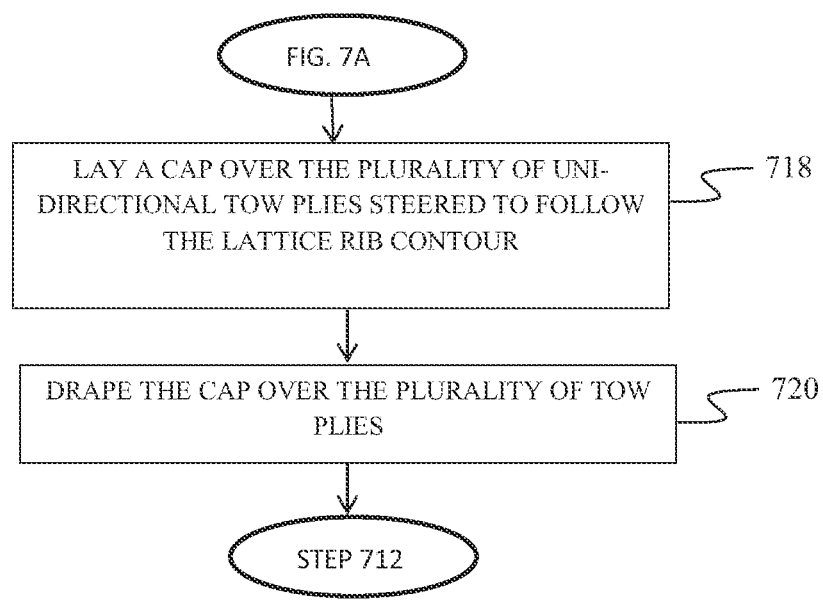

Operation of the programmed SFL heads employed in the disclosed embodiments is described in FIGS. 7A and 7B. At least one unidirectional SFL head 30 employs a fiber placement head 34 to lay down a plurality of collimated tows in a predetermined laminated pattern on a mold surface 24 producing a fuselage skin, step 702. A tow cutter and clamp mechanism 46 terminates and restarts collimated tows at design features or disruptions, step 704. Upon completion of the skin layup, at least one cross plied laminate SFL head 70 employs a band placement head 76 to lay down a cross plied laminate base interface 64 on the skin for a plurality of lattice ribs, step 706, said band placement head 76 steered to laterally diverge from a baseline geodesic lattice to avoid structural design features/disruptions and/or to maintain spacing from adjacent steered lattice ribs, step 708. Steering of the band placement head may additionally include rotation about a nominal axis 104 perpendicular to the surface to maintain fiber or band alignment with the direction of travel, step 710. The at least one unidirectional SFL head 30 then employs the fiber placement head to lay down a plurality of collimated tows on the base interface for a first plurality of unidirectional tow plies on the lattice rib, step 712, said fiber placement head 34 steered to laterally diverge from a baseline geodesic lattice to avoid structural design features/disruptions and/or to maintain spacing from adjacent steered lattice ribs, step 714. Steering of the fiber placement head may additionally include rotation about a nominal axis 104 perpendicular to the surface to maintain fiber or band alignment with the direction of travel, step 716. Upon completion of layup of the plurality of unidirectional tow plies in the lattice rib, the at least one cross plied laminate SFL head 70 employs the band placement head 76 to lay a cap over the plurality of unidirectional tow plies, steered as previously described for tracking the lattice rib shape, step 718. The cap may have a width defined relative to a width of the unidirectional tow plies to cause draping of the cap over the plurality of tow plies, step 720. The cap width may be further defined relative to the width of the unidirectional tow plies and a height of the plurality of tow plies for extending the draped cap over a surface of the skin adjacent the lattice rib, step 722. Steps 712-720 may be repeated for additional layered pluralities of unidirectional tow plies and caps to achieve the designed lattice rib structure as described with respect to FIG. 4.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for fabrication of an aerospace structure comprising: employing at least one unidirectional steered fiber layup head to lay down a plurality of first collimated tows in a predetermined laminated pattern on a mold surface to produce a fuselage skin; steering at least one cross plied laminate steered fiber layup head laterally diverging from a baseline geodesic lattice to lay down a cross plied laminate base interface on the fuselage skin to establish a lattice rib shape for each of a plurality of lattice ribs; steering a band placement head in the at least one cross plied laminate steered fiber layup head laterally diverging from the baseline geodesic lattice to avoid structural design features and to maintain spacing from adjacent steered lattice ribs; employing the at least one unidirectional steered fiber layup head to lay down a plurality of second collimated tows on the base interface of each of the plurality of lattice ribs for a plurality of unidirectional tow plies in each lattice rib; steering a fiber placement head in the at least one unidirectional steered fiber layup head to match the lattice rib shape laterally diverging from the baseline geodesic lattice to avoid the structural design features and to maintain spacing from the adjacent steered lattice ribs;
   employing the at least one cross plied laminate steered fiber layup head to lay a cap over the plurality of unidirectional tow plies in each of the plurality of lattice ribs;
   and steering the band placement head in the at least one cross plied laminate steered fiber layup head laterally diverging from the baseline geodesic lattice to track the lattice rib shape and position the cap over the plurality of unidirectional tow plies.

2. The method as defined in claim 1, wherein steering of the fiber placement head additionally includes rotating the fiber placement head about a nominal axis perpendicular to the mold surface to maintain fiber alignment with a direction of travel.

3. The method as defined in claim 1, wherein steering of the band placement head additionally includes rotating the band placement head about a nominal axis perpendicular to the mold surface to maintain band alignment with the direction of travel.

4. The method as defined in claim 1, wherein the step of employing at least one unidirectional steered fiber layup head to lay down the plurality of first collimated tows in the predetermined laminated pattern on the mold surface to produce the fuselage skin further includes employing a tow cutter and clamp mechanism in the fiber placement head to terminate and restart the plurality of first collimated tows at the structural design features.

5. The method as defined in claim 1, wherein the step of employing the at least one cross plied laminate steered fiber layup head to lay the cap over the plurality of unidirectional tow plies further comprises draping of the cap over the plurality of tow plies.

6. The method as defined in claim 5, further comprising extending the draped cap over a surface of the skin adjacent the lattice rib.

7. The method as defined in claim 1, further comprising rotating the fiber placement head about a nominal axis perpendicular to the surface of the mold to maintain fiber alignment with a direction of travel.

8. The method as defined in claim 1, wherein the at least one unidirectional steered fiber layup head comprises a plurality of spindles each carrying tows of structural fiber, and further comprising dispensing said tows of structural fiber from the spindles with controlled tension to the fiber placement head as individual tows.

9. The method as defined in claim 8, further comprising combining the individual tows in a band collimator in the fiber placement head into the plurality of first and second collimated tows.

10. The method as defined in claim 9, further comprising receiving the plurality of first and second collimated tows from the band collimator in tow restart rollers.

11. The method as defined in claim 10, further comprising pressing the plurality of first collimated tows from the tow restart rollers initially onto the surface of the mold and subsequently on prior laid collimated tows or the base interface with a compaction roller to produce multiple layers.

12. The method as defined in claim 11, further comprising adhering the plurality of first and second collimated tows with a controlled heat source proximate the compaction roller.

13. The method as defined in claim 12, further comprising terminating each fiber band along a direction of travel of the fiber placement head with a band cutter and clamp mechanism.

14. The method as defined in claim 1, wherein the at least one cross plied laminate steered fiber layup head comprises a plurality of cassettes each cassette having rolled cross plied fiber laminate bands of determined widths for the cap and base interface and further comprising feeding each cross plied laminate band under controlled tension to the band placement head.

15. The method as defined in claim 14, further comprising receiving each cross plied laminate band in band restart rollers.

16. The method as defined in claim 15, further comprising pressing each cross plied laminate band onto the skin as the laminate base interface using a compaction roller.

17. The method as defined in claim 16, further comprising adhering each cross plied laminate band using a controlled heat source proximate the compaction roller.

18. The method as defined in claim 17, further comprising terminating a run of each cross plied laminate band along a direction of travel of the band placement head with a band cutter and clamp mechanism.

19. The method as defined in claim 1, further comprising: employing the at least one unidirectional steered fiber layup head to lay down a third plurality of collimated tows on the cap of each of the plurality of lattice ribs for the plurality of unidirectional tow plies in each lattice rib; and steering the fiber placement head in the at least one unidirectional steered fiber layup head to match the lattice rib shape laterally diverging from the baseline geodesic lattice to avoid the structural design features and to maintain spacing from the adjacent steered lattice ribs.

20. The method as defined in claim 19, further comprising: employing the at least one cross plied laminate steered fiber layup head to lay a second cap over the third plurality of unidirectional tow plies in each of the plurality of lattice ribs; and steering the band placement head in the at least one cross plied laminate steered fiber layup head laterally diverging from the baseline geodesic lattice to track the lattice rib shape and position the second cap over the plurality of unidirectional tow plies.

\* \* \* \* \*